US 6,685,594 B2

(12) United States Patent
Kanazawa (10) Patent No.: US 6,685,594 B2
(45) Date of Patent: Feb. 3, 2004

(54) DIFFERENTIAL LIMITING DEVICE FOR A DIFFERENTIAL DEVICE (75) Inventor: Kazuo Kanazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/037,692

(22) Filed: Nov. 9, 2001

(65) Prior Publication Data

US 2002/0055409 A1 May 9, 2002

(30) Foreign Application Priority Data

Nov. 9, 2000 (JP) .................................. P. 2000-342347

(51) Int. Cl.[7] ........................ F16H 48/22; F16D 13/42
(52) U.S. Cl. ..................... 475/249; 180/249; 192/70.23
(58) Field of Search ................................ 475/249, 231; 180/249; 192/54.5, 70.23, 93 A (56) References Cited

U.S. PATENT DOCUMENTS

| 4,238,013 A | * | 12/1980 | Goscenski, Jr. | ............ 192/54.5 |
| 4,704,921 A | * | 11/1987 | Fry | ...................... 192/93 A X |
| 4,762,021 A | * | 8/1988 | Teraoka | .................. 74/665 GA |
| 4,890,510 A | * | 1/1990 | Inui | ....................... 475/249 X |
| 5,158,507 A | * | 10/1992 | Guimbretiere | .............. 475/231 |
| 5,320,586 A | * | 6/1994 | Baxter, Jr. | .................. 475/249 X |
| 5,375,687 A | * | 12/1994 | Inoue et al. | ............. 180/249 X |
| 5,749,803 A | * | 5/1998 | Teraoka et al. | ............. 475/249 |

FOREIGN PATENT DOCUMENTS

| GB | 2045366 | * | 10/1980 | ................ 192/93 A |
| JP | 402066328 | * | 3/1990 | ................ 192/70.23 |
| JP | 5-112149 | | 5/1993 | ......... B60K/17/348 |

* cited by examiner

Primary Examiner—Ha Ho
(74) Attorney, Agent, or Firm—Darby & Darby (57) ABSTRACT A clutch drum is engaged to the rear part of a carrier of a center differential device. A clutch piston, which is rotated together with the rear drive shaft while allowing it to retractively move in a direction along a rear drive shaft, is provided within the clutch drum. Pinion shafts are protruded from the rear end face of the carrier to form protruded parts, which are confronted with the front end face of the clutch piston. A cam part, which is in sliding contact with the protruded parts, is formed on the front end of the clutch piston. When the carrier and the rear drive shaft relatively rotate, the protruded parts retractively move the clutch piston along cam crests of the cam part to press a clutch mechanism.

18 Claims, 8 Drawing Sheets

STROKE LENGTH OF THE CLUTCH PISTON

DIFFERENTIAL LIMITING DEVICE FOR A DIFFERENTIAL DEVICE

BACKGROUND OF THE INVENTION

The present invention relates to a differential limiting device for a differential device, and particularly a differential limiting device for a differential device having a clutch mechanism.

By convention, a differential device is provide with a differential limiting device which additionally applies a predetermined differential limiting torque as an initial torque, and when one of the output shafts slips, it transmits a torque to the other output shaft by bypassing the one of output shaft.

A differential limiting device comprising a hydraulic multiple disc clutch is known. In a center differential device of the planetary gear type, disclosed in Japanese Patent Unexamined Publication No. Hei. 5-112149, a hydraulic multiple disc clutch is provided between a carrier and a drive shaft. The hydraulic multiple disc clutch generates a differential limiting torque depending on a slip of the rear wheel or the like. In this hydraulic multiple disc clutch, a differential limiting torque is generated by a multiple disc type clutch mechanism. Accordingly, a relatively large torque can be generated.

On the other hand, the hydraulic multiple disc clutch needs a hydraulic mechanism for carrying out an engaging control of the clutch mechanism. Accordingly, the structure thereof becomes complicated. In some layout of the differential device, it is difficult to secure a hydraulic pressure source.

SUMMARY OF THE PRESENT INVENTION

Accordingly, it is an object of the present invention to provide a differential limiting device for a differential device which is capable of performing an engaging control of a multiple disc clutch mechanism with a simple structure.

The above-mentioned object can be attained by a differential limiting device for a differential device which limits relative rotations of a shaft for inputting and outputting drive power to a carrier and the carrier aligned with the shaft, the differential limiting device, according to the present invention, comprising:

a clutch mechanism aligned with the shaft for engaging the shaft and the carrier;

a ring-shaped clutch piston being rotated together with the shaft and being retractively movable in an axial direction of the shaft, thereby pressing the clutch mechanism;

protruded parts protruded in the axial direction and each having an end that is confronted with the clutch piston; and cam crests formed on a surface of the clutch piston and confronted with the protruded parts, the cam crests being brought in sliding contact with the ends of the protruded parts respectively;

wherein the protruded parts retractively move along the cam crests of the cam part to move the clutch piston in the axial direction when the carrier and the shaft relatively rotate.

In an embodiment of the differential limiting device, it is advantageous that the differential device is a planetary gear type differential device including a sun gear provided on the shaft, pinions being meshed with the sun gear, and pinion shafts for rotatably supporting the pinions on the carrier, and wherein the protruded parts are formed with the pinion shafts protruded from the carrier.

In addition, in an embodiment of the differential limiting device, it is advantageous that a maximum shift of the clutch piston by the cam crests in the axial direction is smaller than a stroke length of the clutch piston within which the clutch piston is refractively movable, and the cam crests are continuously formed in a ring shape.

Further, in an embodiment of the differential limiting device, it is advantageous that each of the cam crests has cam surfaces that are configured to be asymmetrical with respect to a direction of its rotation relative to the protruded part.

Furthermore, an embodiment of the differential limiting device according to the present invention may further comprises:

elastic members interposed between the clutch piston and the clutch mechanism for pressing the clutch mechanism.

Moreover, an embodiment of the differential limiting device according to the present invention may further comprises:

an elastic member placed in the clutch mechanism.

DETAILED DESCRIPTION OF THE PREFERRED EMBODIMENTS

Figure 1:
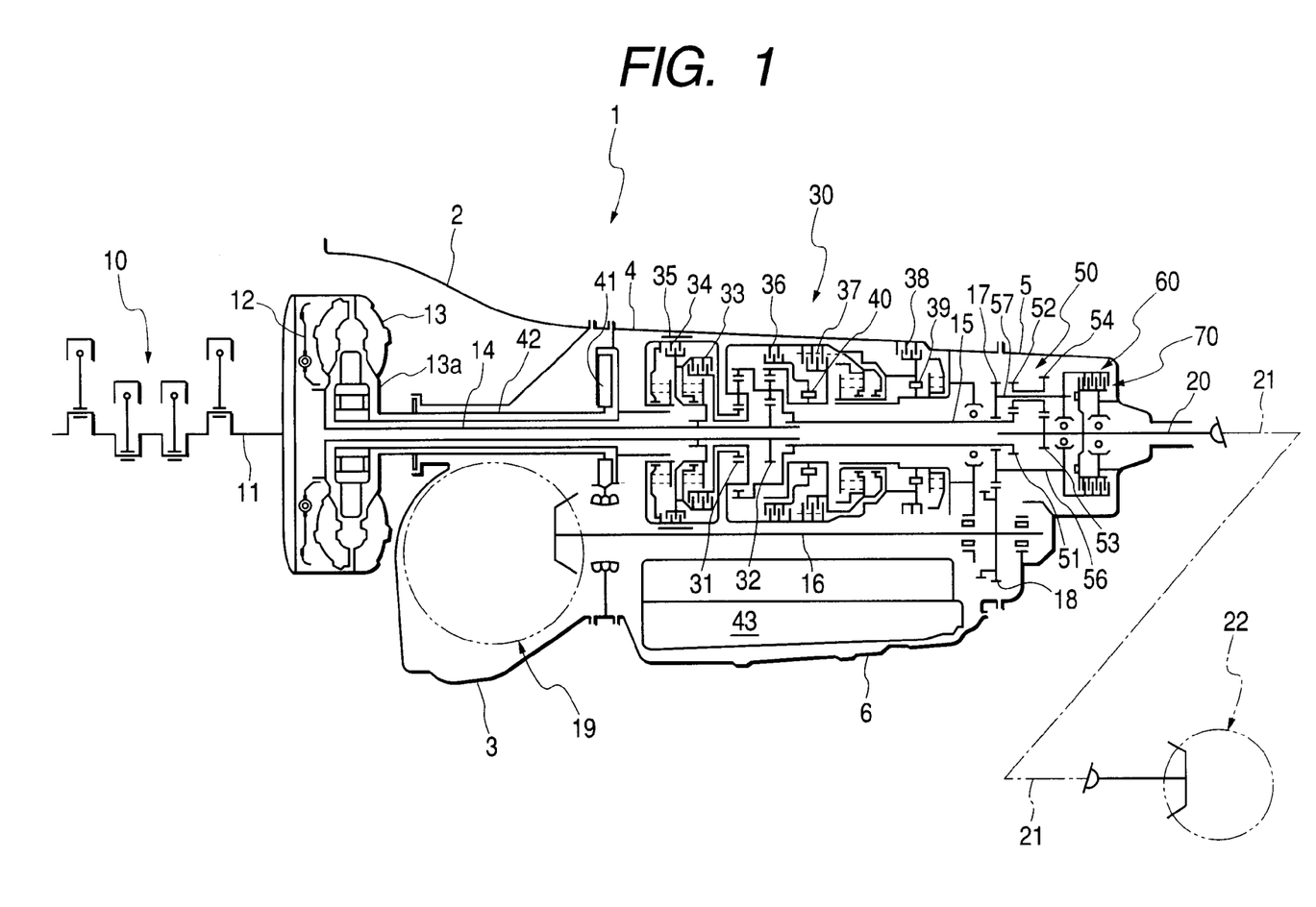
FIG. 1 is a diagram showing a mechanical arrangement of a drive force distribution device for a four-wheel drive vehicle, according to a first embodiment of the present invention.
Figure 2:
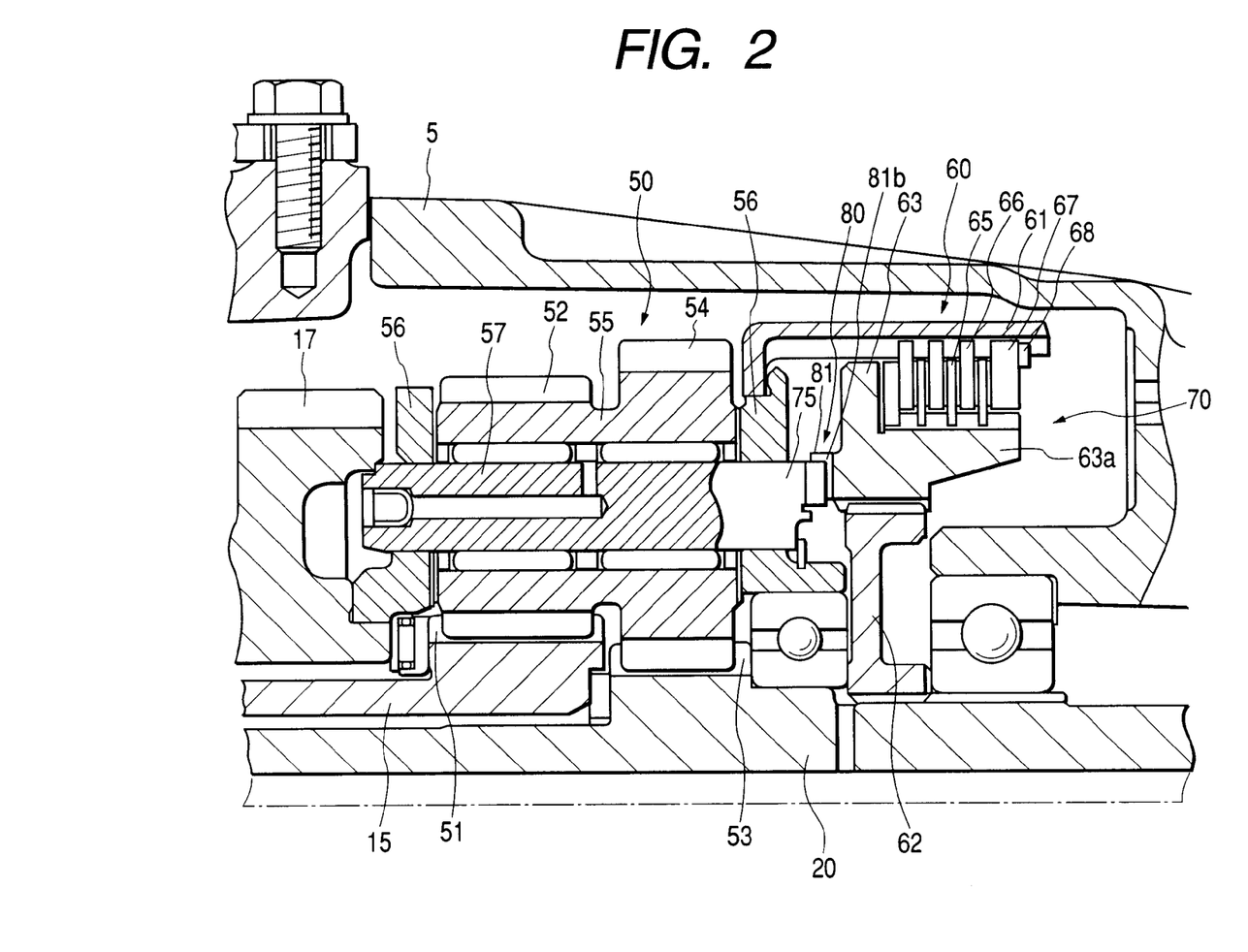
FIG. 2 is a longitudinal sectional view showing a center differential device, according to the first embodiment.
Figure 3:
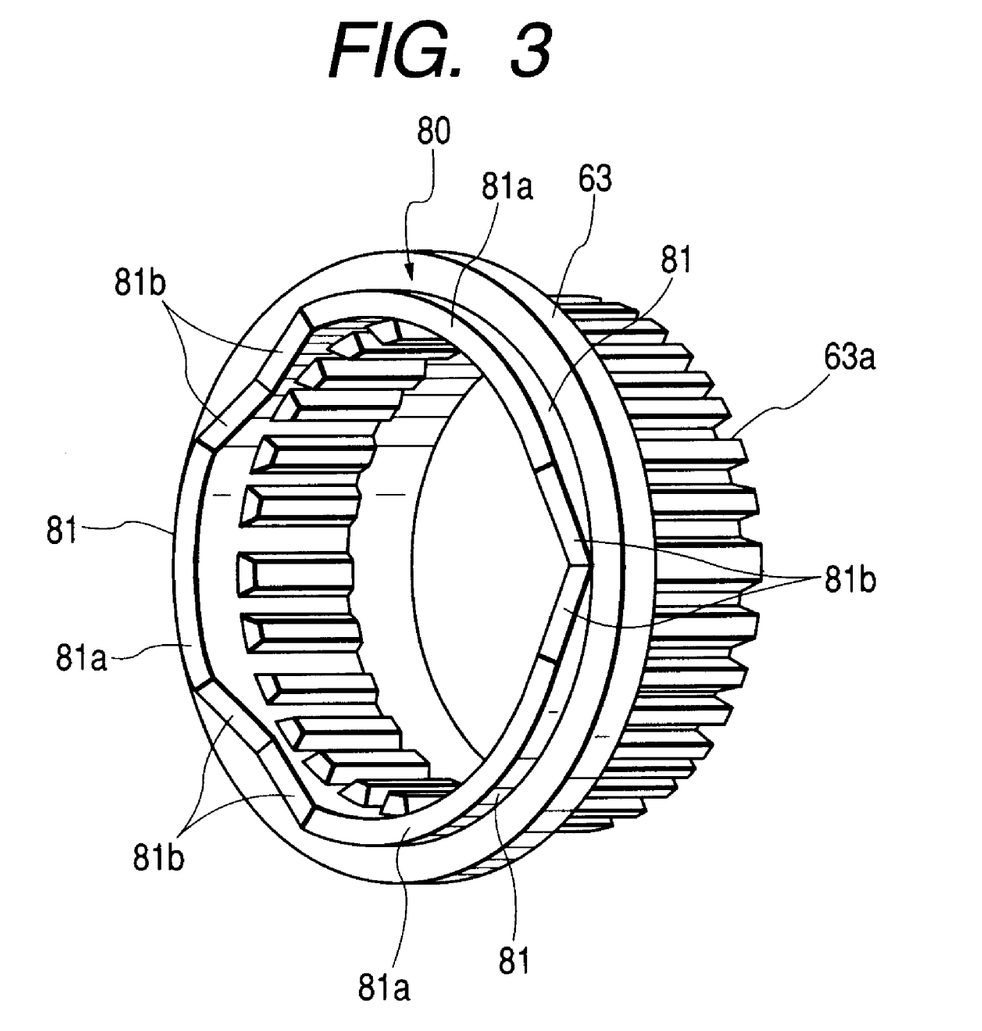
FIG. 3 is a perspective view showing a clutch piston, according to the first embodiment.
Figure 4:
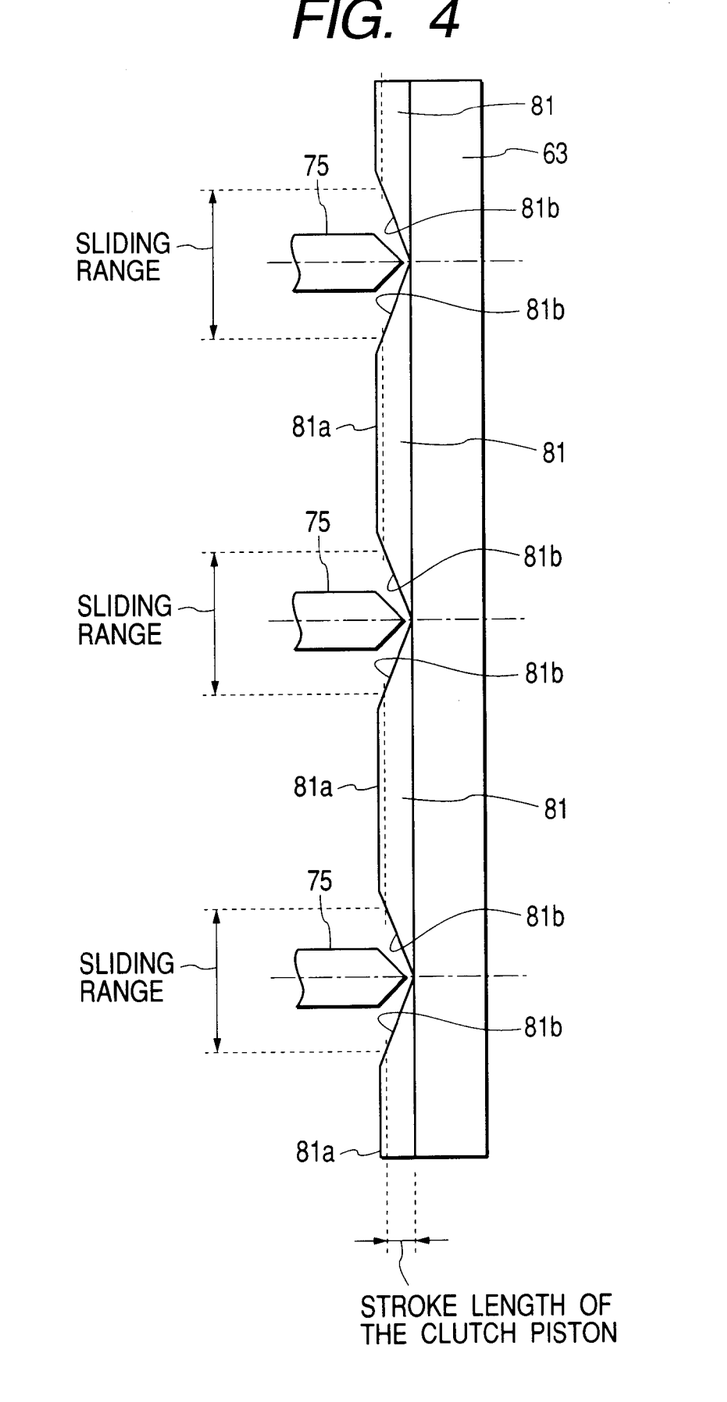
FIG. 4 is a development showing a cam part, according to the first embodiment.
Figure 5A:
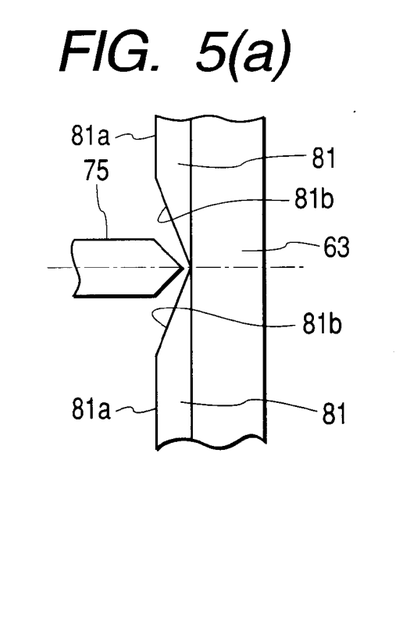
FIGS. 5(a) and 5(b) are an explanatory diagram showing a movement of a clutch piston based on cam crests, according to the first embodiment.
Figure 5B:
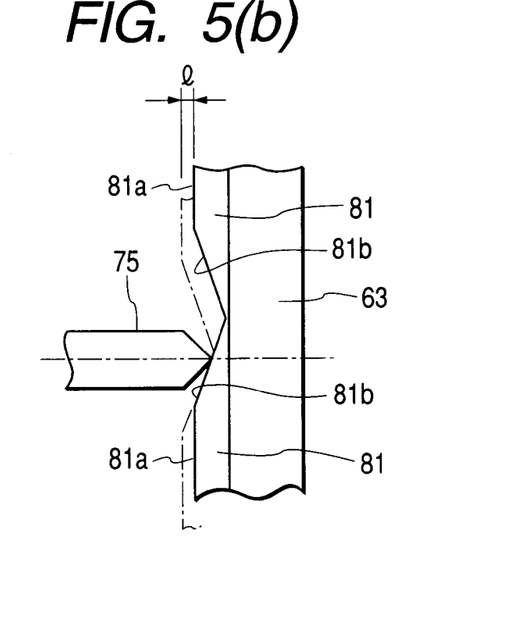
Figure 6A:
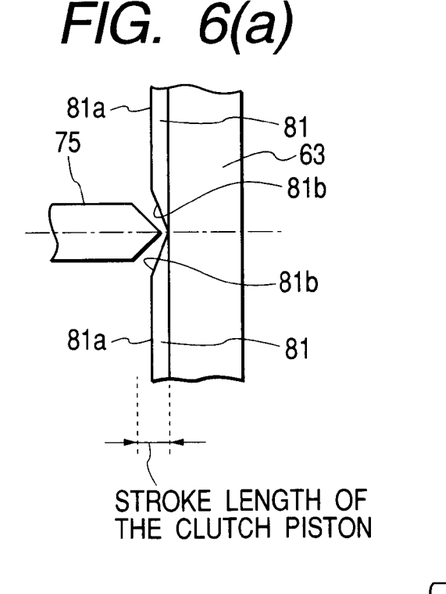
FIGS. 6(a) and 6(b) are an explanatory diagram for explaining a modification of the cam crests.
Figure 6B:
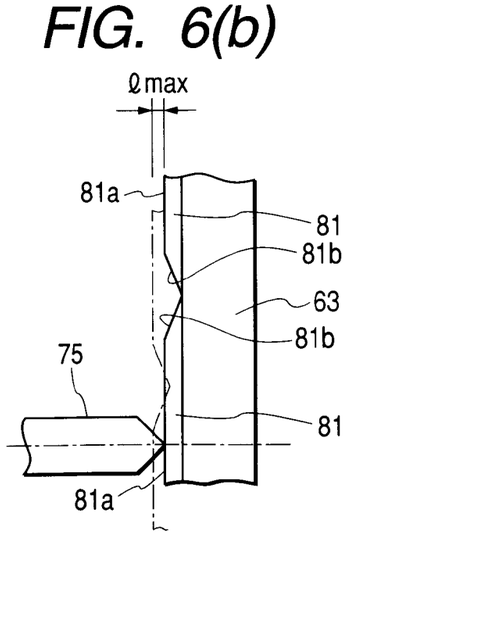

The preferred embodiments of the invention will be described with reference to the accompanying drawings. FIGS. 1 through 7 show a first embodiment of the invention. Of those figures, FIG. 1 is a schematic diagram showing a power distribution system for a four-wheel drive vehicle, which is a first embodiment of the invention. FIG. 2 is a sectional view showing a center differential device. FIG. 3 is a perspective view showing a clutch piston. FIG. 4 is a development showing a cam part. FIG. 5 is an explanatory diagram useful in explaining an operation of a clutch piston, which is based on cam crests. FIG. 6 is an explanatory diagram for explaining a modification of a cam crest. FIG.

Figure 7:
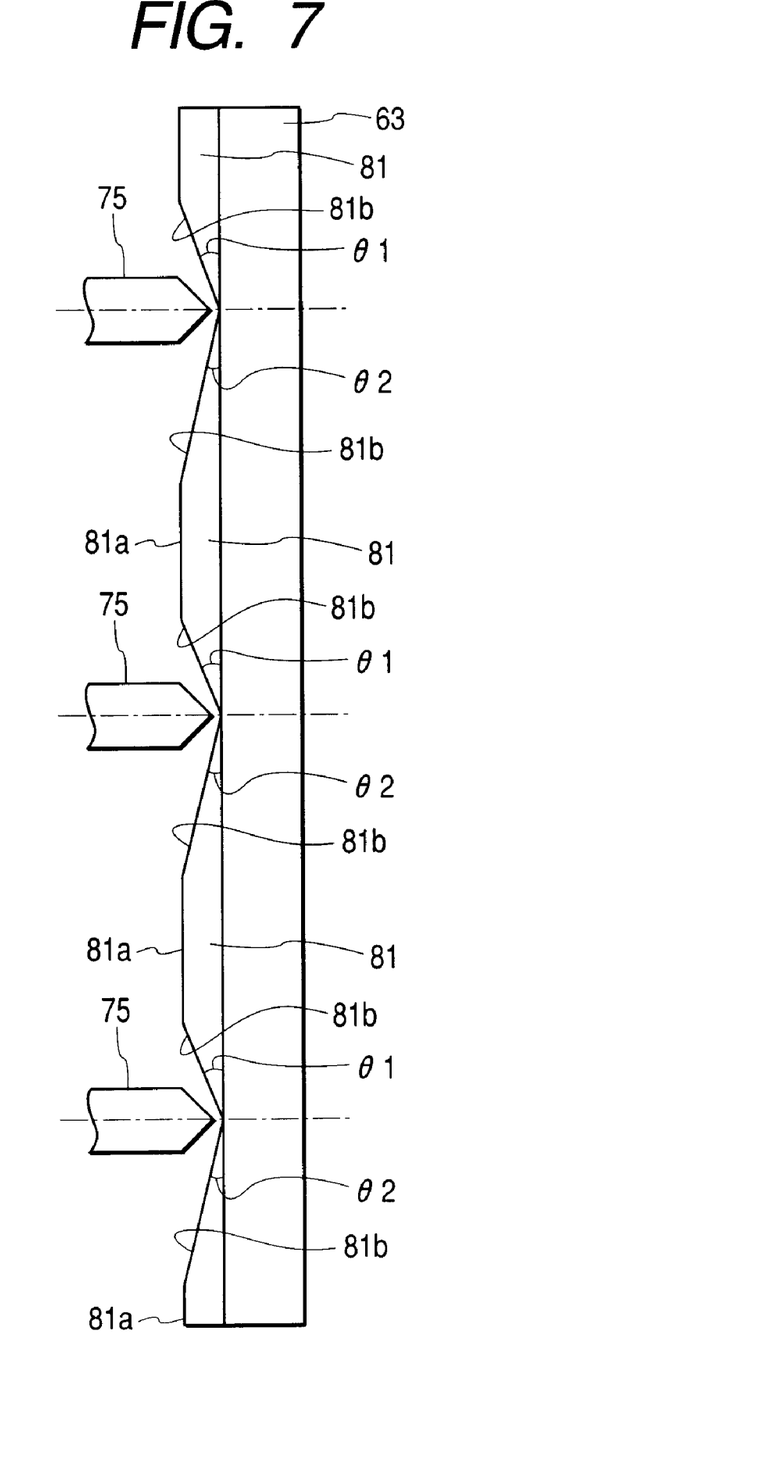
FIG. 7 is an explanatory diagram for explaining another modification of cam crests.

7 is an explanatory diagram for explaining another modification of a cam crest.

In FIG. 1, reference numeral 1 designates a transaxel, vertically mounted, which is a drive system for a four-wheel drive vehicle. The transaxel 1 includes a torque converter case 2 and a differential case 3, which are disposed in the front part of the transaxel 1, while being formed integrally with the transaxel 1. A transmission case 4 is joined to the rear ends of those cases 2 and 3. An extension case 5 is joined to the rear end of the transmission case 4. A power transmission device is installed within the extension case 5. An oil pan 6 is mounted on the lower side of the transmission case 4.

Reference numeral 10 designates an engine. A crank shaft 11 of the engine 10 is coupled to the input of a torque converter 13 having a lockup clutch 12, which is disposed within the torque converter case 2. A transmission input shaft 14 of an automatic transmission 30, which is placed in the transmission case 4, is coupled to the output side of the torque converter 13.

An output shaft (transmission output shaft) 15 of the automatic transmission 30 is aligned with the input shaft (transmission input shaft) 14. The transmission output shaft 15 is coupled to the input of a center differential device 50, which is placed in the extension case 5. A front drive shaft 16 and a rear drive shaft 20 as a shaft part are coupled in a branched fashion to the output of the center differential device 50.

The front drive shaft 16 is disposed in parallel with the input shaft 14 and the transmission output shaft within the transmission case 4. The rear end of the front drive shaft 16 is coupled to the center differential device 50, through a pair of reduction gears 17 and 18. The front end of the front drive shaft 16 is provided to a front differential device 19, which is disposed within the differential case 3. The front wheel output shaft (not shown) for supporting the front wheels by shaft is coupled to the front differential device 19. The rear drive shaft 20 is provided to the rear wheel output shaft (not shown) for supporting the rear wheels by shaft, through a propeller shaft 21, a rear differential device 22, and the like.

The automatic transmission 30 includes a front planetary gear 31 and a rear planetary gear 32. In connection with the rear planetary gear 32, the front planetary gear 31 is provided with a high clutch 33, a reverse clutch 34, a brake band 35, a forward clutch 36, an overuning clutch 37, a low/reverse clutch 38, and one-way clutches 39 and 40. Some of those friction engaging elements are selectively engaged, thereby constructing a speed change stage of a forward 4-speed and reverse 1-speed.

In the front part of the automatic transmission 30, an oil pump 41 couples an impeller sleeve 13a with a drive shaft 42, and always drives them. A control valve body 43 is contained in the oil pan 6. The control valve body 43 supplies oil to the above friction engaging elements and discharges oil from them, thereby individually controlling the engagement and disengagement of those elements.

The center differential device 50 consists of a differential device of the planetary gear type. Specifically, as shown in FIG. 2, a first sun gear 51 of large diameter is integral with the transmission output shaft 15. A plurality (e.g., three) of first pinions 52 of small diameter are engaged with the first sun gear 51, while being equidistantly spaced.

A second sun gear 53 of small diameter is integral with the rear drive shaft 20. A plurality (e.g., three) of second pinions 54 of large diagram are meshed with the second sun gear 53, while being equidistantly spaced.

The first and second pinions 52 and 54 are formed integrally with pinion members 55, respectively. The pinion members 55 are rotatably supported on pinion shafts 57 fastened to a carrier 56.

The transmission output shaft 15 is set at the front end of the carrier 56, and inserted into the carrier and is rotatable therein. The rear drive shaft 20 is set at the rear end of the carrier and inserted into the carrier and is rotatable therein. And the first sun gear 51 and the second sun gear 53 are placed in the central space thereof. The pinion shafts 57 are horizontally arranged so that the first pinions 52 is meshed with the first sun gear 51, and the second pinions 54 is meshed with the second sun gear 53.

The reduction gear 17 is fastened to the carrier 56. A drive power that is transmitted through the pinion shafts 57 to the carrier 56, as shown in FIG. 1, is transmitted to the front wheels by way of the reduction gears 17 and 18, the front drive shaft 16 and the front differential device 19. A drive force that is transmitted from the rear drive shaft 20 to the second sun gear 53 is transmitted to the rear wheels by way of the rear differential device 22.

A differential limiting device 60 of a multiple disc mechanism type is provided on the rear part of the center differential device 50, thereby effecting a differential limiting between the front and rear wheels. The differential limiting device 60 is made up of a clutch drum 61 fixed to the rear end of the carrier 56, and a clutch hub 62 spline-coupled to the rear drive shaft 20 within the clutch drum 61.

A clutch piston 63 is spline-coupled to the outer peripheral surface of the clutch hub 62, and the clutch piston 63 is retractively movable in a direction along the rear drive shaft 20. The clutch piston 63 is spline-coupled to the clutch hub 62, so that it is allowed to refractively move in the direction along the rear drive shaft 20, and it is rotated together with the rear drive shaft 20. As a result, it is refractively and rotatably movable relative to the clutch drum 61.

A tubular part 63a is formed integral with the rear end of the clutch piston 63 in a state that the outer peripheral surface of the tubular part 63a is confronted with the inner peripheral surface of the clutch drum 61.

A plurality of drive plates 65 spline-coupled to the tubular part 63a and a plurality of driven plates 66 coupled to the clutch drum 61 are alternately arranged along the rear drive shaft 20 between the clutch drum 61 and the tubular part 63a. In the rear part of them, a retainer plate 67 spline-coupled to the clutch drum 61 is engaged and stopped at a snap ring 68, thereby forming a key part of a multiple disc clutch mechanism 70.

The rear ends of the pinion shafts 57 are rearwardly extended, and protruded from the rear end of the carrier 56, and those protruded ones form protruded parts 75. Those protruded parts 75 are confronted with the front end of the clutch piston 63 within the clutch drum 61. A cam part 80, which is in sliding contact with the protruded parts 75, is formed on the front end of the clutch piston 63.

In the structure of the cam part 80, as shown in FIG. 3, a plurality (three in the embodiment) of cam crests 81 like configured are chained in a ring fashion (The number of cam crests 81 may appropriately be selected if it is within the number of pinion shafts). In each of those cam crests 81, slanted cam surfaces 81b are symmetrically located on both sides of a top surface 81a. Each of the protruded parts 75 is put facing a position between the slanted cam surfaces 81b of the cam crests 81 (see FIG. 4).

As shown in FIG. 4, a distance from the front end face of the clutch piston 63 to the top surface 81a is longer than a stroke length of the clutch piston 63 within which the clutch piston 63 is retractively movable. This defines a slidable range of each protruded part 75 over the slanted cam surfaces 81b.

An operation of the embodiment thus constructed will be described. A drive force generated by the engine 10 is first input to the input shaft 14 of the automatic transmission 30, through the torque converter 13. A drive force having experienced a predetermined speed change in the automatic transmission 30 is output from the transmission output shaft 15, and input to the first sun gear 51 of the center differential device 50.

The first pinions 52 which are meshed with the first sun gear 51, are formed integrally with the second pinions 54 which are meshed with the second sun gear 53 of the rear drive shaft 20. Since the reduction gear 18 of the front drive shaft 16 is meshed with the reduction gear 17 of the carrier 55, which supports the pinions 52 and 54. A torque output from the transmission output shaft 15 is distributed to the rear drive shaft 20 and the front drive shaft 16, through the center differential device 50.

A torque distributed to the rear drive shaft 20 is transmitted to the rear wheel output shaft (not shown) for supporting the rear wheels, by way of the rear drive shaft 20, the propeller shaft 21 and the rear differential device 22. A torque distributed to the front drive shaft 16 is transmitted through the front differential device 19 to the front wheel shaft (not shown). As a result, the vehicle runs in four-wheel drive mode.

In a case where the vehicle gets out of a bad road, a low $\mu$ road, or runs in a state that one of the wheels is in a floating state, if a differential revolution occurs between the front and rear wheel transmission shafts, viz., the carrier 56 and the rear drive shaft 20 relatively rotate, the protruded parts 75 and the clutch piston 63 relatively rotate.

At this time, the clutch piston 63 is rearwardly moved along the cam crests 81 (slanted cam surfaces 81b) to press the clutch mechanism 60. As a result, the drive plates 65 are brought into sliding contact with the driven plates 66. And a differential limiting torque, which depends on a shift "1" quantity (see FIG. 5(b)) of the clutch piston 63, is generated in the differential limiting device 60.

When the carrier 56 and the rear drive shaft 20 are further rotated relatively, and the protruded parts 75 reach the ends of sliding ranges of the cam crests 81, the shift quantity "1" of the clutch piston 63 is maximized (=stroke length of the clutch piston 63), and the clutch mechanism 60 is completely fastened, so that the center differential device 50 is differentially locked.

In the embodiment as mentioned above, the engaging control of the multiple disc clutch mechanism 70 is carried out with a simple structure including the protruded parts 75 provided on the end face of the carrier 56 and the cam part 80 provided on the surface of the clutch piston 63, which is confronted with the protruded parts 75. Therefore, there is no need of using a complicated hydraulic mechanism, and this leads to simplification of the structure of the differential limiting device 60. Further, such a mechanism does not need a hydraulic pressure source and others. Accordingly, a design freedom on the layout of the differential device or the like is increased.

Additionally, the pinion shafts 57 are formed protruding from the end face of the carrier 56, so that the number of required parts is reduced. This contributes further structure simplification of the differential limiting device 60.

A distance from the front end face of the clutch piston 63 to the top surface 81a of the cam crests 81 is shorter than the stroke length within which the clutch piston 63 is retractively movable (FIG. 6(a)). As a result, the maximum shift "1max" (see FIG. 6(b)) of the clutch piston 63 by the sliding of the protruded parts 75 relative to the cam crests 81 may be set to be smaller than the stroke length. Accordingly, the torque limiter function may be added to the differential limiting device 60. Thus, in the structure mentioned above, when the protruded parts 75 are rotated relative to the clutch piston 63 by a predetermined quantity of rotation, then the sliding surfaces of the cam crests 81 on which the protruded parts 75 slide moves from the slanted cam surfaces 81b to the top surface 81a, and the shift quantity of the clutch piston 63 reaches its maximum value. As a result, the shift quantity of the clutch piston 63 is limited, thereby preventing a torque generated by the multiple disc clutch mechanism 70 from increasing and exceeding a predetermined torque.

As shown in FIG. 7, a slanting angle $\theta 1$ of the slanted cam surface 81b of each of the cam crests 81 is set to be different from a slanting angle $\theta 2$ of the slanted cam surface 81b. The cam crest 81 is configured to be asymmetrical with respect to a direction of its rotation relative to the protruded part 75. If so done, the characteristic of the differential limiting torque generated in the clutch mechanism 70 may be set so as to vary depending on a direction of the relative rotation of the carrier 56 and the rear drive shaft 20.

Figure 8:
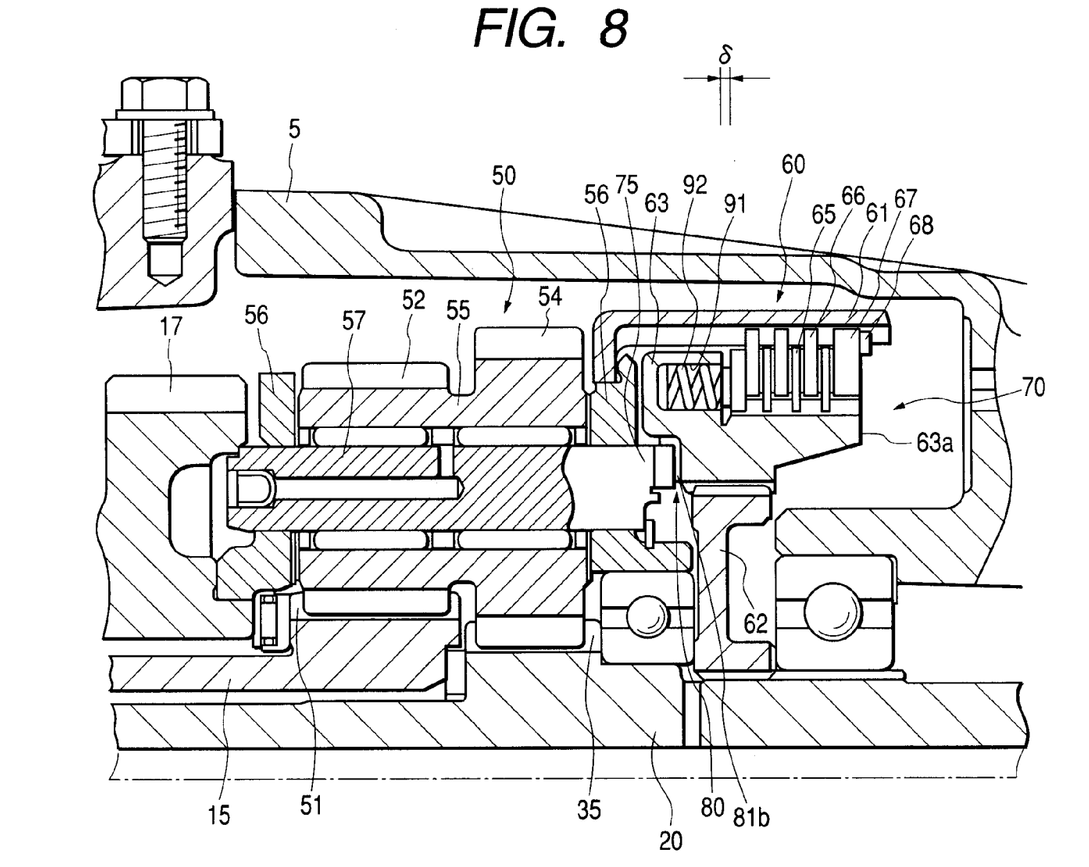
FIG. 8 is a longitudinal sectional view showing a center differential device according to a second embodiment of the invention.

FIG. 8 is a longitudinal sectional view showing a center differential device which is a second embodiment of the present invention. The second embodiment is different from the first embodiment in that coil springs 92 as elastic members are interposed between the clutch piston 63 and the multiple disc clutch mechanism 70. No description on the remaining portion of the second embodiment which are equal to or resembling the corresponding one of the first embodiment will be given by merely attaching like reference numerals to the related parts.

More specifically, a plurality of recesses 91 (only one recess 91 is illustrated in FIG. 8) are formed in the surface of the clutch piston 63, which is confronted with the clutch mechanism 70. The coil spring 92 is held in each of the recesses 91. The rear ends of those coil springs 92 are protruded from the rear end of the clutch piston 63. The quantity of each coil spring 92 is selected to be longer than a gap $\delta$ between the clutch piston 63 and the multiple disc clutch mechanism 70 under condition that the shift quantity "1" of the clutch piston 63 when it is shifted rearwardly is 0°. The coil springs 92 presses the multiple disc clutch mechanism 70 rearward by a given weak force.

The second embodiment thus constructed produces the following advantageous effect, in addition to the effect by the first embodiment. Since the clutch piston 63 presses constantly the coil springs 92 by a weak force in the rearward direction, the multiple disc clutch mechanism 70 generates an initial torque.

Figure 9:
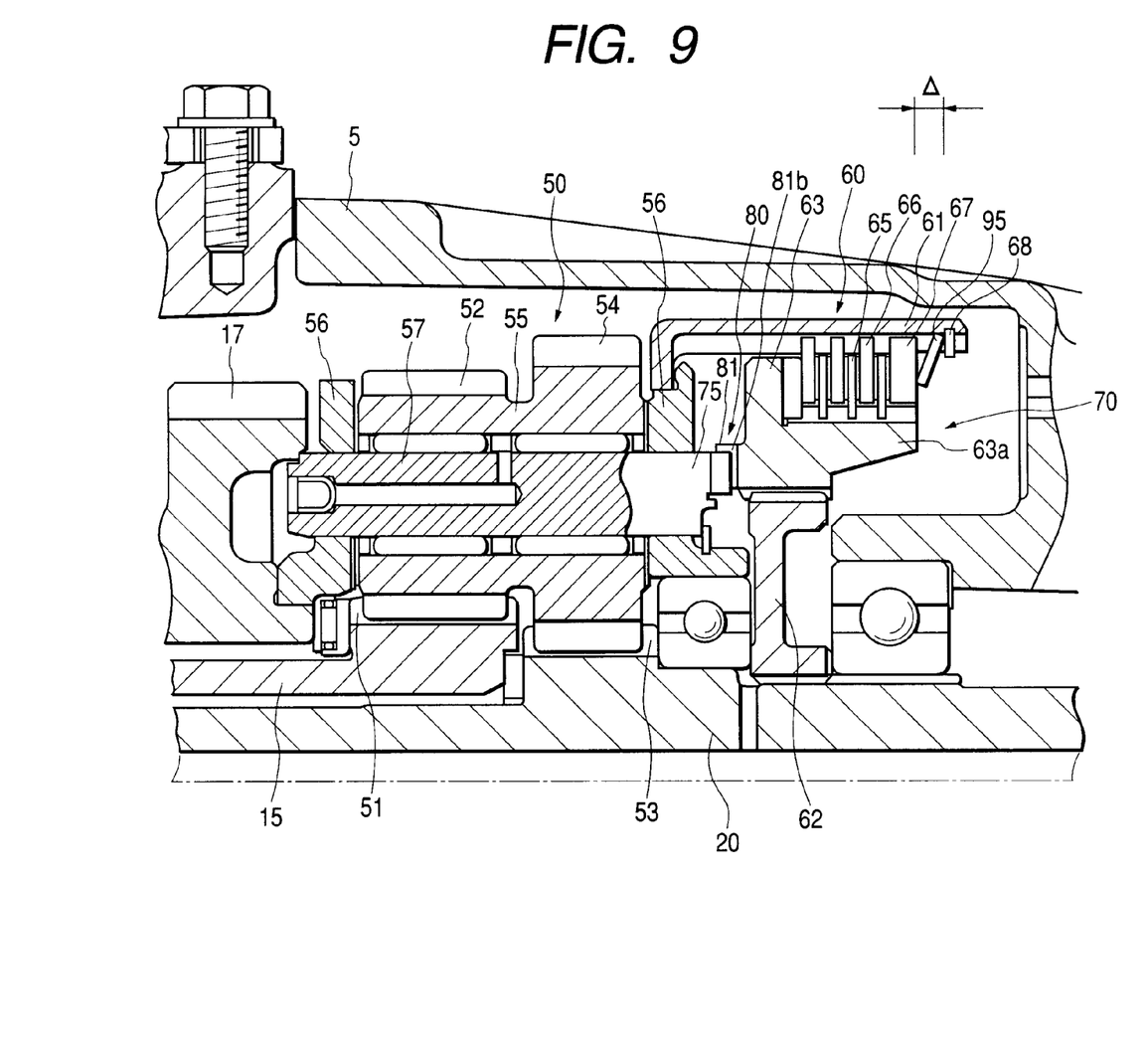
FIG. 9 is a longitudinal sectional view showing a center differential device, according to a third embodiment of the invention.

FIG. 9 is a longitudinal sectional view showing a center differential device, which is a third embodiment of the invention. The third embodiment is different from the first embodiment in that a dish spring 95 as an elastic member is placed in the multiple disc clutch mechanism 70. Like reference numerals are used for designating like or equivalent portions in the embodiments mentioned above, for simplicity of explanation.

To be more specific, the multiple disc clutch mechanism 70 forms a gap $\Delta$ between the retainer plate 67 and the snap ring 68 when the shift quantity "1" of the clutch piston 63 when it is shifted rearwardly is 0°. A dish 95 having a squeeze, which is larger than the gap $\Delta$, is interposed between the retainer plate 67 and the snap ring 68. The dish spring 95 presses forward the multiple disc clutch mechanism 70 (the drive plates 65 and the driven plates 66, and the like) by a weak force.

The third embodiment produces the following advantageous effect in addition to the effect by the first embodiment. Since the dish spring 95 is constantly pressed by a weak force in the forward direction, the multiple disc clutch mechanism 70 generates an initial torque. By appropriately setting a spring constant of the dish spring 95, the characteristic of the torque generated by the multiple disc clutch mechanism 70 may variously be set with respective to the shift quantity of the clutch piston 63.

In each embodiment mentioned above, the differential limiting device is provided in the planetary differential device. If required, a protruded part is formed integrally with the carrier of the bevel type differential device, whereby forming a similar differential limiting device is formed.

It is evident that the setting of the input and output elements to the differential device is not limited to the above mentioned one.

The differential device to which the differential limiting device is applied is not limited to the center differential device. It is readily understood that the differential device may be applied to the front differential device, the rear differential device, or the like.

The configuration of the slanted cam surfaces are not limited to the above one, as a matter of course. In an example of another configuration, the slanted cam surfaces are curved, and a lift quantity of the clutch piston with respective to the relative rotations of the clutch piston and the cam is varied in an exponential function fashion.

As seen from the foregoing description, when the carrier and the shaft are relatively rotated, the protruded parts formed on the carrier retractively move the clutch piston along the cam crests of the clutch piston, whereby a clutch of the multiple disc type is formed which is capable of engaging the shaft and the carrier. Accordingly, an engaging control of the clutch may be carried out with a simple structure.

While there has been described in connection with the preferred embodiments of the invention, it will be understood to those skilled in the art that various changes and modifications may be made therein without departing from the invention, and it is aimed, therefore, to cover in the appended claims all such changes and modifications as fall within the true spirit and scope of the invention.

What is claimed is:

1. A differential limiting device of a differential device mounted on a four wheel drive vehicle having an engine for providing driving power to a front drive shaft and to a rear drive shaft, an automatic transmission mechanically and coaxially connected to a crankshaft of said engine for changing a rotational speed of the crankshaft in accordance with driving conditions, and a transmission output shaft included in said automatic transmission and coaxially connected to said crankshaft via a transmission input shaft for transmitting said driving power to both drive shafts, said differential device having a carrier directly and coaxially connected to said transmission output shaft for absorbing a relative rotational difference between said front drive shaft and said rear drive shaft, said differential limiting device coaxially mounted on said rear drive shaft for limiting said relative rotational difference, said differential limiting device comprising:

a clutch mechanism coaxially aligned with said rear drive shaft for engaging and for disengaging said rear drive shaft with said carrier;

a clutch piston coaxially mounted on said rear drive shaft for being rotatable therewith and for pressing said clutch mechanism by being retractably movable in an axial direction of said rear drive shaft;

a protrusion provided to protrude from an end surface of said carrier so as to confront with said clutch piston; and a cam surface formed on an end surface of said clutch piston for engaging with said protrusion by slidably contacting with said cam surface so as to effectively perform a differential function of said differential limiting device by a relatively axial movement of said protrusion;

wherein said differential limiting device is a planetary gear differential device including a sun gear provided on said rear drive shaft and a plurality of pinions meshed with said sun gear and supported on pinion shafts in said carrier; and wherein said protrusion is provided to protrude from said end surface of said pinion shaft so as to confront with said clutch piston.

2. The differential limiting device according to claim 1, further comprising an elastic member interposed between said clutch piston and said clutch mechanism for pressing said clutch mechanism.

3. The differential limiting device according to claim 1, further comprising an elastic member placed in said clutch mechanism.

4. The differential limiting device according to claim 1, wherein:

said clutch piston has a maximum shift range which is smaller than a retractable stroke length of said clutch piston; and said cam surface has a continuously circular configuration.

5. The differential limiting device according to claim 4, further comprising an elastic member interposed between said clutch piston and said clutch mechanism for pressing said clutch mechanism.

6. The differential limiting device according to claim 4, further comprising an elastic member placed in said clutch mechanism.

7. The differential limiting device according to claim 4, wherein said cam surface has an asymmetrical configuration with respect to a rotational direction thereof.

8. The differential limiting device according to claim 7, further comprising an elastic member placed in said clutch mechanism.

9. The differential limiting device according to claim 7, further comprising an elastic member interposed between said clutch piston and said clutch mechanism for pressing said clutch mechanism.

10. The differential limiting device according to claim 1, wherein said cam surface has an asymmetrical configuration with respect to said rotational direction thereof.

11. The differential limiting device according to claim 10, further comprising an elastic member interposed between said clutch piston and said clutch mechanism for pressing said clutch mechanism.

12. The differential limiting device according to claim 10, further comprising an elastic member placed in said clutch mechanism.

13. A differential limiting device of a differential device mounted on a four wheel drive vehicle having an engine for providing driving power to a front drive shaft at td to a rear drive shaft, an automatic transmission mechanically and coaxially connected to a crankshaft of said engine for changing a rotational speed of the crankshaft in accordance with diving conditions, and a transmission output shaft included in said automatic transmission and coaxially connected to said crankshaft via a transmission input shaft for transmitting said diving power to both drive shafts, said differential device having a carrier directly and coaxially connected to said transmission output shaft for absorbing a relative rotational difference between said front drive shaft and said rear drive shaft, said differential limiting device coaxially mounted on said rear drive shaft for limiting said relative rotational difference, said differential limiting device comprising:

- a clutch mechanism coaxially aligned with said rear drive shaft for engaging and for disengaging said rear drive shaft with said carrier;
- a clutch piston coaxially mounted on said rear drive shaft for being rotatable therewith and for pressing said clutch mechanism by being retractably movable in an axial direction of sail rear drive shaft;
- a protrusion provided to protrude from an end surface of said carrier so as to confront with said clutch piston; and
- a cam surface formed on an end surface of said clutch piston for engaging with said protrusion by slidably contacting with said cam surface so as to effectively perform a differential function of said differential limiting device by a relatively axial movement of said protrusion;

wherein said clutch piston has a maximum shift range which is smaller than a retractable stroke length of said clutch piston; and wherein said cam surface has a continuously circular configuration.

14. The differential limiting device according to claim 13, further comprising an elastic member interposed between said clutch piston and said clutch mechanism for pressing said clutch mechanism.

15. The differential limiting device according to claim 13, further comprising an elastic member placed in said clutch mechanism.

16. The differential limiting device according to claim 13, wherein said cam surface has an asymmetrical configuration with respect to said rotational direction thereof.

17. The differential limiting device according to claim 16, further comprising an elastic member interposed between said clutch piston and said clutch mechanism for pressing said clutch mechanism.

18. The differential limiting device according to claim 16, further comprising an elastic member placed in said clutch mechanism.

* * * * *